United States Patent [19]

Molina

[11] 4,326,981

[45] Apr. 27, 1982

[54] NONSTAINING LEAK TRACER SOLUTION AND METHOD EMPLOYING SAME

[75] Inventor: Orlando G. Molina, Westminster, Calif.

[73] Assignee: Rockwell International Corporation, El Segundo, Calif.

[21] Appl. No.: 66,609

[22] Filed: Aug. 15, 1979

[51] Int. Cl.³ .............................................. C09K 11/06
[52] U.S. Cl. ................................ 252/301.19; 252/408
[58] Field of Search ........................... 252/408, 301.19

[56] References Cited

U.S. PATENT DOCUMENTS

| | | | |
|---|---|---|---|
| 3,607,333 | 9/1971 | Alburger | 252/301.19 X |
| 3,915,885 | 10/1975 | Molina | 252/301.19 |
| 3,915,886 | 10/1975 | Molina | 252/301.19 |
| 3,939,092 | 2/1976 | Molina | 252/408 X |
| 4,035,641 | 7/1977 | Molina | 250/302 |
| 4,160,375 | 7/1979 | Brittain et al. | 73/104 |

FOREIGN PATENT DOCUMENTS 610419  12/1960  Canada ........................... 252/301.19

*Primary Examiner*—F. Edmundson
*Attorney, Agent, or Firm*—Charles T. Silberberg; Max Geldin

[57] ABSTRACT

Leak tracer solution particularly effective for inspection of aircraft fuel tanks and lines prior to use, without staining painted surfaces of the aircraft consists essentially of an aqueous solution containing not more than about 10%, generally about 0.1 to about 10%, of a nonionic oxyalkylated aliphatic alcohol surfactant, and a small amount, generally about 0.005 to about 1.0%, of a water soluble, e.g. dual visibility, dye such as Uranine, which does not migrate into or penetrate the painted aircraft surface. A small amount of an anti-parasitic agent can be added to prevent algae growth. The solution is used by introducing it into the interior of new fuel tanks and lines, viewing the external surfaces of such tanks and lines under suitable lighting conditions such as daylight or black (fluorescent) light to detect any cracks or leaks, and draining the solution from the tanks and lines. After such draining, preferably a "depuddling" agent is introduced to chemically blend any water-based leak tracer solution remaining in depressions of the fuel tanks or lines, with the oil-based aircraft's fuel, for removal of such remaining leak tracer solution. A preferred "depuddling" agent is a 50–50 mixture by volume of a petroleum-based aircraft fuel, and a nonionic oxyalkylated aliphatic alcohol surfactant.

9 Claims, No Drawings

NONSTAINING LEAK TRACER SOLUTION AND METHOD EMPLOYING SAME

BACKGROUND OF THE INVENTION

This invention relates to an improved leak tracer composition or solution for detecting leaks, particularly in the fuel tanks and lines of aircraft, and is particularly concerned with an inproved leak tracer solution of the above type, and which does not adhere to external surfaces contacted by the leak tracer, and which does not stain the painted, and particularly white painted, surfaces of the aircraft.

Newly fabricated fuel tanks and lines for aircraft are generally tested for cracks and leaks before installation in the aircraft, utilizing a leak tracer solution. Such leaks tracer solutions heretofore employed usually consist of water, a detergent, glycerin and a dye, usually a red dye.

However, when employing such conventional leak tracer solutions, the red dye contained in the leak tracing solution tended to permanently stain the white painted surfaces of the aircraft if a spill or leak occurred. Such painted surfaces can be the exterior surfaces of the suel tanks, or other adjacent surfaces of the aircraft such as the wings or other components. Further, a film of the glycerin contained in the formulation adhered to all surfaces contacted by the leak tracer. Also, there were algae-like substances bearing the color of the leak tracer found entrapped in and clogging certain passages of the aircraft's fuel system, and some of the leak tracer solution remained entrapped or "puddled" in depressions and low areas of the fuel tanks and lines. Careful and repeated cleaning was thus necessary until all of the spilled and remaining leak tracer solution was removed, and clogging fuel lines were freed of the leak tracer solution.

Dye penetrant compositions containing nonionic oxyalkylated alcohol surfactants, derived from both primary and secondary aliphatic alcohols, as vehicle, and a dye, are described in my U.S. Pat. Nos. 3,915,885 and 3,915,886. These, however, are non-aqueous solutions which are applied to the external surfaces of test bodies or parts to detect surface flaws or cracks therein by retention of dye penetrant in such cracks and flaws, and by viewing such retained dye entrapments under suitable lighting conditions.

Accordingly, an object of the present invention is the provision of an improved leak tracer composition or solution particularly designed for fuel tanks and lines. A further object of the invention is to provide a leak tracer solution of the above type which does not stain the painted, and particularly white painted, surfaces of aircraft. A still further object of the invention is to provide a novel water-based leak tracer solution which does not contain substances such as glycerin which tend to adhere to the interior surfaces contacted by the leak tracer solution, and which do not promote parasitic growth which clog passages, e.g. in aircraft fuel systems. Another object is to provide a simple, inexpensive, highly penetrating and essentially water-based leak tracer solution of the above type, containing a minimum of readily available components. A further object is to provide procedure for detection of cracks and leaks, particularly in aircraft fuel tanks and lines, employing the above leak tracer solution.

SUMMARY OF THE INVENTION

The above objects and advantages are achieved according to the invention by employing as a leak tracer solution a composition consisting essentially of water, a nonionic oxyalkylated aliphatic alcohol surfactant, and a small amount of a dye which is essentially non-staining on painted surfaces.

As described more fully hereinafter, the leak tracer solution of the invention contains a major proportion of water, not more than about 10% of a nonionic oxyalkylated aliphatic alcohol surfactant, and generally about 0.005 to about 1.0% by weight of such water soluble essentially non-staining dye.

A small amount of an anti-parasitic agent is added to the leak tracer solution to inhibit parasitic algae growth in the solution.

As a feature of the invention, the leak tracer composition or solution hereof is free of glycerin and does not adhere to the surfaces such as the interior surfaces of fuel tanks and lines contacted by the leak tracer solution. Further, the "creepability" characteristics, relating to the ability of the leak tracer solution to penetrate into and aid in the detection of cracks and leaks in fuel tanks and lines, is superior in the case of the leak tracer of the present invention, as compared to the heretofore employed glycerin-based leak tracer. Also, the leak tracer of the present invention employing particularly certain water-soluble dyes which do not migrate or penetrate into the painted surfaces of aircraft, do not stain the generally white painted surfaces of the aircraft, usually containing a polyurethane or epoxy resin base.

Following introduction of the leak tracer solution into fuel tanks and fuel lines of aircraft for detection of leaks therein, the leak tracer solution is removed and any leak tracer solution which is entrapped or puddled in low areas and crevices in the fuel tanks and lines can be removed by introduction of a solution or "depuddling" agent which is miscible with the aqueous leak tracer solution and also with the petroleum-based aircraft fuel, so that the aircraft fuel subsequently introduced into the fuel tanks and lines can then be used to flush out such remaining pockets of entrapped leak tracer solution after it is mixed with depuddling agent.

The water-based leak tracer solution of the present invention cannot wet previously fuel-wetted surfaces of fuel tanks and lines, and therefore cannot penetrate and disclose leak paths in such fuel-wetted surfaces. Thus the leak tracer solution of the present invention is applicable for use in detecting cracks and leaks only in newly fabricated and dry fuel tanks and lines which require leak detection inspection.

DETAILED DESCRIPTION AND EMBODIMENTS OF THE INVENTION

The nonionic surfactants which are incorporated into the aqueous leak tracer solutions or compositions of the invention consist essentially of an oxyalkylated aliphatic alcohol or mixtures thereof, formed of an aliphatic primary or secondary alcohol carrying ethoxy or propoxy groups, including polyoxyethylene or polyoxypropylene groups, or mixtures thereof.

More particularly, one class of such nonionic surfactants can be defined as straight chain, primary, aliphatic oxyalkylated alcohols, generally in the form of mixtures thereof, wherein the primary aliphatic alcohols can have from 8 to 20 carbon atoms, preferably 10 to 18 carbon atoms, and the oxyalkyl groups are ethylene oxide and propylene oxide, preferably in the form of a mixture thereof.

One group of nonionic surfactants within the class of materials defined immediately above is a cogeneric mixture of compounds represented by the formula:

R—O(A)H wherein:

R is an essentially linear alkyl group having from 10 to 18 carbon atoms, with the proviso that at least 70 weight percent of said compounds in said mixture have an R of from 12 to 16 carbon atoms, and A is a mixture of oxypropylene and oxyethylene groups, said oxypropylene and oxyethylene groups being from 55% to 80% of the total weight of the compounds, the oxypropylene and oxyethylene ratio of said total weight being from 0.85:1 to 2.75:1, preferably 1.25:1 to 2.25:1.

Another preferred class of condensation products or oxyalkylated alcohols within the above definition are those wherein the aliphatic alcohols of the oxyalkylated alcohols, or R in the above formula, ranges from 12 to 18 carbon atoms, and the total number of ethylene oxide and propylene oxide groups in the mixture thereof, or designated A in the above formula, ranges from about 4 to about 14.

The term "cogeneric mixture" as employed herein, designates a series of closely related homologues obtained by condensing a plurality of oxide units, with an alcohol or a mixture thereof. As is shown, when a mixture of this type is generated, various oxyalkylene chain lengths are obtained.

Alcohols which may be employed in the preparation of the products noted above are those essentially linear, primary, aliphatic alcohols having from 8 to 20 carbon atoms, preferably 10 to 18 carbon atoms. Mixtures of alcohols are usually preferred since their use provides for a good balance of properties in the resulting products. Examples of alcohols which are operable include decyl alcohol, undecyl alcohol, lauryl alcohol, tridecyl alcohol, tetradecyl alcohol, pentadecyl alcohol, cetyl alcohol, heptadecyl alcohol, stearyl alcohol, hydrogenated tallow alcohol, and mixtures thereof. They may be naturally-derived such as from coconut oil or synthetically-derived such as from linear alkanes or linear olefins.

The above nonionic surfactants employed in conjunction with the dye of the leak tracer solution according to the invention, are prepared by condensing an alcohol or mixture of alcohols, as described above, with a mixture of ethylene oxide and propylene oxide, in the presence of an alkaline catalyst, such as potassium hydroxide. The oxide mixture may be added to the alcohol in one continuous step or it may be added in several steps. The products thus produced possess random distribution of oxyethylene and oxypropylene groups.

The nonionic surface active agents described above and their method of preparation are disclosed in U.S. Pat. No. 3,504,041, and such disclosure is incorporated herein by reference. These surface active agents are believed to include for example, that class of surfactants which are marketed as the "Plurafac" surfactants "RA-40" grades.

Another class of biodegradable liquid, water miscible oxyalkylated alcohol condensation products within the above definition are those wherein the aliphatic alcohol, or R, is a straight chain alkyl group having from 8 to 20 carbon atoms, the number of ethylene oxide groups in the mixture thereof with propylene oxide, or A ranges from 3.75 to 12.75, and the number of propylene oxide groups in such mixture ranges from 1.7 to 7.0, the oxyethylene to oxypropylene ratio in such mixtures being from 1.8:1 to 2.2:1. This mixture of condensation products and the method of their preparation are disclosed in U.S. Pat. No. 3,340,309, and such disclosure is also incorporated herein by reference. The nonionic oxyalkylated alcohols marketed as the "RO-20" grades of "Plurafac", are believed representative of the class of surface active agents disclosed in the latter patent.

Various other "Plurafac" grades which are marketed and are believed to be generally within the above-described classes of oxyalkylated alcohol surfactants are those designated RA-43, A-24, A-25, B-25-5, B-26 and D-25.

Dye penetrant compositions containing the above described primary aliphatic oxyalkylated alcohols as vehicle, and a dye are described in my U.S. Pat. No. 3,915,885.

A class of particularly preferred nonionic biodegradable surfactants which can be employed in the leak tracer compositions according to the present invention are ethoxylates of a mixture of linear secondary aliphatic alcohols, with the hydroxyl groups randomly distributed, the linear aliphatic hydrophobic portion of such alcohols being a mixture of alkyl chains containing in the range from 10 to 17 carbon atoms, preferably from 11 to 15 carbon atoms, and containing an average of from 3 to 12 moles of ethylene oxide.

The above particularly preferred class of ninionic biodegradable surfactant employed according to the invention is a mixture of compounds which can be represented by the formula:

$$CH_3-(CH_2)_n-CH_3 \quad (2)$$
$$|$$
$$O-(CH_2-CH_2O)_m-H$$

where n is in the range from 9 to 13, and m is 3 to 12.

Although preferably each of the above-defined surfactants is formed of a mixture of two or more linear alkyl hydrophobic chains ranging from $C_{11}$ to $C_{15}$, as noted below, the surfactant can contain a single such chain formed from a single secondary aliphatic alcohol of the types described below.

The linear alkyl hydrophobic portion of the above defined surfactant is a mixture of $C_{11}$ to $C_{15}$ linear alkyl chains, and can be derived from a mixture of $C_{11}$ to $C_{15}$ aliphatic secondary alcohols, for example the secondary undecyl, dodecyl, tridecyl, tetradecyl and pentadecyl alcohols. The hydrophilic portion of the surfactant is a polyoxyethylene chain randomly attached to any carbon atom of the linear alkyl hydrophobic chains, other than to the terminal carbon atoms thereof, through an ether linkage. It will accordingly be understood that the specific carbon atom in the alkyl hydrophobic chains to which the hydrophilic polyoxyethylene chain is attached will become a $$-CH-$$
$$|$$

group. Such hydrophilic polyoxyethylene chain is generally expressed in terms of an average number of moles of ethylene oxide.

Illustrative examples of biodegradable nonionic surfactants of the types defined in the above formula are those consisting of a mixture of ethoxylates of from 11 to 15 carbon atoms in the aliphatic hydrophobic chain, and which have an average of 3, 5, 7, 9 and 12 moles of ethylene oxide, respectively, as the hydrophil.

Materials corresponding to these five examples of biodegradable nonionic surfactants are marketed, respectively, as:

| Tergitol | 15-S-3 |
|---|---|
| " | 15-S-5 |
| " | 15-S-7 |
| " | 15-S-9 |
| " | 15-S-12 |

In each case of the Tergitol S series of surfactants listed above, the number to the left of the "S" indicates a hydrophobic aliphatic chain of from 11 to 15 carbon atoms derived from a mixture of alcohols on $C_{11}$ to $C_{15}$ backbone chains, and the number to the right of the "S" designates the average number of moles of ethylene oxide as the hydrophil. Thus, for example, Tergitol 15-S-5 is a mixture of linear aliphatic alcohols in the $C_{11}$ to $C_{15}$ range ethoxylated with an average of 5 moles of ethylene oxide. All of these commercially marketed Tergitol S series of surfactants are water soluble except for Tergitol 15-S-3, which is essentially water insoluble. Mixtures of these materials can also be employed in providing the dye penetrant of the invention, such as a mixture of the above Tergitols 15-S-5 and 15-S-3; a mixture of 15-S-3 and 15-S-9; and a mixture of 15-S-5 and 15-S-9.

The above preferred class of nonionic biodegradable surfactants employed in the leak tracer solution according to the invention, are prepared by reacting an alcohol or mixture of alcohols, with the desired proportion of ethylene oxide, in the presence of an alkaline catalyst, such as potassium hydroxide. The ethylene oxide may be added to the alcohol or mixture of alcohols in one continuous step or it may be added in several steps. The products thus produced possess random distribution of oxyethylene groups, as noted above.

Another process for preparing the above nonionic surfactants in the form of ethoxylates of linear secondary aliphatic alcohols, is described in U.S. Pat. No. 2,870,220.

Tergitol 15-S-3 is essentially water insoluble and is usually employed in combination with the other members of the Tergitol S series noted above, such as Tergitol 15-S-5 and 15-S-9.

Dye penetrant compositions containing the above described ethoxylates of secondary aliphatic alcohols as vehicle and a dye are described in my U.S. Pat. No. 3,915,886.

Also, particularly effective leak tracer solutions are provided according to the invention employing a combination or mixture of the above Tergitols 15-S-5 and 15-S-9, and to which there can be added optionally Tergitol 15-S-3, as described in my U.S. Pat. No. 3,939,092.

There can also be employed ethoxylates of linear primary alcohols, corresponding to the ethoxylates of the linear secondary alcohols of the Tergitol S series of nonionic surfactants described above. Thus, the Tergitol 25-L series of nonionic surfactants is derived by ethoxylation of a blend of $C_{12}$ to $C_{15}$ linear primary alcohols, the soluble derivatives of which contain from about 5 to about 9 moles of ethylene oxide, per mole of primary alcohol.

The dyes which are incorporated into the leak tracer compositions or solutions of the invention are water soluble dyes which can be either daylight visible dyes or fluorescent dyes made visible by exposure to black or fluorescent light, or such dyes can have dual visibility, that is, they are visible either in daylight or are fluorescent under black or fluorescent light. Such dyes are of a type which do not migrate into or penetrate painted surfaces used on aircraft, such as white polyurethane paints.

Preferred dyes which can be used are the water soluble uranine, rhodamine and eosin dyes.

A preferred water soluble uranine dye having the characteristics noted above is Uranine Concentrate 1801 dye, Color Index Yellow 73, marketed by Keystone, Ingham Co., Los Angeles, California. This dye is a sodium salt of fluorescein, and is a yellow-green dual visibility dye visible by exposure either to daylight or fluorescent light.

The soluble rhodamine dyes such as Rhodamine B, Rhodamine-Color Index 10 and Rhodamine WT-Color Index Acid Red 388 can be used. These are also dual visibility dyes. Rhodamine dyes tend to stain painted surfaces, but can be used in leak tracer solutions on equipment such as fuel tanks and lines which have not yet been installed in already painted aircraft. For this reason rhodamine dyes are not preferred dyes for use in the leak tracer solutions of the invention.

The eosin dyes such as Eosin G and Eosin Acid Red 87 also can be used, particularly in the form of their sodium or potassium salts. The eosin dyes are fluorescent dyes which are made visible by exposure to black or fluorescent light.

Water is employed in major proportions in the leak detector solution of the invention. Although tap water can be employed, the water used should be as free as possible from residue forming materials such as minerals. Thus, distilled or deionized water can also be used.

The amount of nonionic oxyalkylated surfactant which is incorporated into the leak detector solution of the invention should not be more than about 10% by weight of the composition. Generally, from about 0.1 to about 10% by weight of the surfactant is used. Although up to 20% by weight of the surfactant can be used, this is uneconomical and is not preferred. It has been found, however, that a low surfactant content, ranging from about 0.3 to about 2.0% by weight of the leak tracer solution or composition provides best results in improved "creepability" of the leak tracer solution, that is, its ability to penetrate and detect very small cracks and leaks in fuel tanks and lines.

The amount of dye which is incorporated into the leak detector solution containing water and the above nonionic surfactant, to produce the leak tracer composition of the invention, is generally small, e.g. ranging from about 0.005 to about 1.0% by weight of the composition. Preferably about 0.01 to about 0.10% by weight of the dye is present in the leak tracer solution.

Optionally, a very small amount, e.g. a few drops, of an anti-parasitic agent, per gallon of leak tracer solution, e.g. 8 to 12 ounces per 500 gallons, is incorporated in the leak tracer solution to prevent parasitic algae growth in the solution, particularly if it is stored over an extended period of time. A typical anti-parasitic agent for this purpose is the material marketed as "Clear Bath 105540" which is believed to be an amino based composition, by Spectrum Medical Industries, Torrance, Calif. However, any suitable alkaline anti-parasitic agent can be employed.

An optimum leak tracer solution according to the invention is the solution or composition A below.

| COMPOSITION A | |
|---|---|
| Component | Percentage by Weight |
| Water | 99.41 |
| Tergitol 15-S-9 | .56 |
| Uranine Conc. 1801 Dye | .03 |
| "Clear Bath 105540" (anti-parasitic agent) | 8 to 12 ounce per 500 gallons water |

It will be noted that Composition A above has low surfactant content, that is in the above noted preferred surfactant range of 0.3 to 2.0% by weight of the composition.

Another representative leak tracer solution, according to the invention, is solution of Composition B below.

| COMPOSITION B | |
|---|---|
| Component | Percentage by Weight |
| Water | 94.97 |
| Tergitol 15-S-9 | 5.0 |
| Uranine Conc. 1801 Dye | .03 |
| "Clear Bath 105540" (anti-parasitic agent) | 8 to 12 ounces per 500 gallons water |

In table 1 below are set forth additional examples of leak tracer compositions or solutions according to the invention.

TABLE 1

| Component | Compositions (% by weight) | | | | | | |
|---|---|---|---|---|---|---|---|
| | C | D | E | F | G | H | J |
| Water | 99.65 | 99.57 | 99.26 | 98.94 | 95.93 | 94.97 | 99.41 |
| Tergitol 15-S-9 | 0.3 | | | 1.0 | | | |
| Tergitol 15-S-5 | | 0.4 | | | 4.0 | 5.0 | |
| 75% Tergitol 15-S-5 and 25% Tergitol 15-S-9 | | | 0.7 | | | | |
| Uranine Conc. 1801 Dye | 0.05 | 0.03 | 0.04 | 0.06 | 0.07 | 0.03 | 0.03 |
| "Clear Bath 105540" (anti-parasitic agent) | 8 to 12 ounces per 500 gals. water | | | | | | |
| Plurafac A-24 | | | | | | | 0.56 |

It is also noted that compositions C, D, E, F and J are illustrative of the preferred low surfactant content compositions of the invention, containing not more than 2.0% surfactant by weight, while compositions B, G and H, each containing more than 2.0% by weight of surfactant, are illustrative of the high content surfactant leak tracer solutions of the invention.

Incorporation of a small amount of an anti-parasitic agent, as noted above, particularly into those leak tracer solutions having a low surfactant content controls and avoids formation of parasitic algae-like growths in the leak tracer solution when stored for substantial periods of time, e.g. up to about 30 days. However, since the biodegradable non-ionic surfactants such as the Tergitols noted above, are a known source of food for bacteria, the high surfactant content leak tracer solutions according to the invention tend to generate parasitic growth after periods of storage, even when an anti-parasitic agent is incorporated therein.

Tests for leak tracer efficiency or creepability were carried out as between a presently employed leak tracer solution containing glycerin, described in Example 1 below, and two leak tracer compositions of the invention, one being a high surfactant composition represented by Composition B above, and the other being a low surfactant content leak tracer as represented by Composition A noted above.

In carrying out this test, to evaluate the efficiency of these leak tracers, a fixture was employed in the form of a metal plate having 13 deep grooves inscribed therein. The plate is placed on a base which serves the purpose of supplying a controlled amount of the leak tracer to the base of the inscribed plate. The plate is vertically positioned on the base, and as the plate contacts the leak tracer to be tested, each of the grooves therein instantaneously commences to serve as an exposed capillarity tube to allow the leak tracer to travel upwards in the respective grooves. This upward movement of the leak tracer solution, or its creepability, is timed, and at the end of twenty seconds, the creeping activity of the leak tracer has been exhausted or has come to a stop. Under suitable lighting conditions for the respective dyes of the leak tracers, such as black light illumination for fluorescent dyes, a mark is made with a felt tip pen at the upper end of travel of the leak tracer solution in the respective grooves. The measurements for the respective grooves on a single plate for each of the respective leak tracers was totalled and averaged. A set of three complete tests for a single leak tracer is considered sufficient. A comparison of these measurements between the above noted three leak tracers provides a quantitative rating as to the creepability or efficiency of the respective leak tracer solutions.

The creepability data and results for the three above noted leak tracer solutions is set forth in Table 2 below.

TABLE 2

LEAK TRACER SOLUTION CREEPABILITY TEST

Measurements of Upward Linear Creepability Generated In 20 Seconds by Leak Tracer Solutions Each Submitted to Three Separate Tests - Totalling 39 Observations

| Water Based Fluorescent Leak Tracers Tested | Lowest Averaged Reading (Inches) | Highest Averaged Reading (Inches) | Average of the 39 Readings (Inches) |
|---|---|---|---|
| Leak Tracer Solution with glycerin of Example 1 | 1.83 | 3.58 | 2.78 |
| Invention Solution Leak Tracer with high surfactant content - Composition B | 1.60 | 3.00 | 2.34 |
| Invention Solution Leak Tracer with low surfactant content - Composition A | 2.23 | 3.65 | 3.05 |

It is seen from Table 2 above that the low surfactant content leak tracer solution A of the invention showed the highest creepability and efficiency of all three leak tracer solutions tested. In addition, its low surfactant content renders it the most economical to employ. Although the high surfactant content leak tracer solution B of the invention had lower creepability than the leak tracer solution containing glycerin, such high surfactant content leak tracer solution has the above noted advantages over the glycerin-containing presently employed leak tracer solution, in avoiding formation of a gel-like growth within fuel tank lines, and thus avoiding the clogging of passages therein, and also does not stain the painted surfaces of aircraft with which it can come into contact.

In the method for employing the leak tracer solution of the invention to test for leaks in the fuel tanks and lines, e.g. of an aircraft, the leak tracer solution is purged or introduced into newly fabricated, clean and dry fuel tanks and lines. During the test procedure, the leak tracer solution in the tanks and lines can be at a pressure of say 5 psi, but the pressurization of the leak tracer solution during testing is not necessary.

The external surfaces of the tanks and lines are inspected for leaks while under suitable illumination, that is, either white illumination where the dye in the leak tracer solution is a daylight dye, or under black light illumination in dark enclosures when the dye in the leak tracer solution is a fluorescent dye, or has dual visibility. Particularly the fluorescent characteristics of the fluorescent and dual visibility dyes are used to advantage for locating minute leaks. After locating and marking the leaks indicated by dye smears resulting from passage of leak tracer solution through such leaks, the level of the leak tracer in the tank or lines can be dropped sufficiently to permit repair of the crack or leak, followed by retesting with the leak tracer solution if desired, to verify the effectiveness of the repair.

Following inspection for leaks in the system, and any repairs thereof, if desired, the leak tracer solution is drained from the fuel tanks and lines to remove the leak tracer. In order to remove any residual leak tracer solution which remains entrapped in depressions or crevices of the fuel tanks and lines, a "depuddling" agent is used after the draining of the main body of leak tracer solution from the system. The depuddling agent employed is of a unique type which chemically blends the water-based leak tracer solution of the invention which remains entrapped within the system, with the oil or petroleum-based aircraft fuel, which can consist of saturated and/or unsaturated hydrocarbons, so that in this manner, the remaining portions of the leak tracer solution are leached out of the system. A typical depuddling agent for this purpose is a mixture of a nonionic oxyalkylated aliphatic alcohol of the types described above, with a petroleum based aircraft jet fuel containing a mixture of hydrocarbons containing 6 to 16 carbon atom chains, e.g. a 50—50 mixture, by volume, of Tergitol 15-S-5 and JP-4 jet fuel, consisting essentially of a mixture of 2 parts of gasoline (6 to 8 carbon atom hydrocarbons) to 1 part of kerosene (10 to 16 carbon atom hydrocarbons), by weight.

After the depuddling agent is introduced into the fuel tank and lines, for removal of residual leak tracer solution, the resulting miscible mixture of leak tracer solution and depuddling agent is drained from the system. Any remaining residues of such mixture are miscible with subsequently introduced petroleum-based fuel, and the resulting mixture can be again drained from the system or burned out by the aircraft engines during test runs prior to introduction of the main body of fuel into the fuel tanks and lines for operation of the aircraft.

The leak tracer solution removed from the tanks and lines following testing, can be reused, and excess depuddling agent drained from the tanks and lines also can be reused, if desired.

The above noted depuddling agent composition and its use in combination with the leak tracer solution of the present application, as described above, are disclosed and claimed in applicant's copending application Ser. No. 66,608, filed Aug. 15, 1979.

The following are examples of the practice of the present invention.

EXAMPLE 1

About 6500 gallons of a leak tracer solution was introduced into the fuel tanks and lines of an aircraft in the "as painted" newly fabricated condition. Such leak tracer solution contained, for 500 gallons of tap water, 2.5 gallons Tergitol 15-S-9, 1200 grams Uranine Conc. 1801 dye and 20 gallons glycerin, corresponding by weight, to about 0.5% Tergitol 15-S-9, about 5% glycerin, and about 0.03% Uranine Conc. 1801 dye, the remainder water. The external surfaces of the tanks and lines were viewed under both white light and black light, indicating the location of numerous leaks by the yellow-green dye smears emitted by the uranine dye in the leak tracer solution. Such leaks were marked, the leak tracer solution was partially drained from the system, and the leaks thus located were repaired.

Observations made after leak testing indicated that an undetermined amount of the leak tracer solution remained entrapped (puddled) inside the tanks and lines. Also, a film of glycerin stubbornly adhered to the surfaces contacted by the solution. Apparently a gel-like substance was entrapped in some fuel passages.

The leak tracer solution of the invention, Composition A, was introduced into a system simulating the fuel tanks and lines noted above, and having painted surfaces. The external surfaces of the equipment were viewed under white and black light, indicating the location of numerous leaks by the yellow-green dye smears emitted by the leaking solution. The leaks were marked, the leak tracer solution was drained from the system, and the leaks thus located were repaired.

The above noted depuddling agent, consisting of 50 parts of Tergitol 15-S-5 and 50 parts of JP-4 Petroleum-based jet fuel, by volume, was introduced into the tanks and lines of the above simulated system to remove any remaining portions of the leak tracer solution, Composition A, and the resulting mixture of depuddling agent and residual leak tracer solution, was removed.

Although considerable wetting of the painted outside surfaces of the simulated aircraft tanks and lines took place as a result of the use of the leak tracer solution, Composition A, no staining of the painted surfaces resulted, and there was no contamination, that is, no formation of a sticky film such as formed by the glycerin in the above noted formulation, on the surfaces wetted by the solution, and there was no evidence of a gel-like substance entrapped in the system.

EXAMPLE 2

Results similar to those of Example 1 were obtained employing in place of the leak tracer solution, Composition A, the respective leak tracer colutions C, D, E, F and J above.

EXAMPLE 3

The procedure of Example 1 is repeated, but employing the respective leak tracer solutions B, G and H of Table 1 above, in place of leak tracer solution or Composition A.

Results comparable to those of Example 1 were obtained; however, it was noted that when employing leak tracer solutions B, G and H containing a high surfactant content as noted above, the dye smears and indications of cracks and leaks when the system was subjected to ultraviolet light, were not as sharp and definitive as in the case of the leak tracer solution of Example 1.

From the foregoing it is seen that the invention of the present application provides an improved leak tracer solution having a number of important advantages. The characteristics and advantages afforded by the leak tracer solution and process employing same of the invention include (1) economy of manufacture, (2) non-flammability of the leak tracer solution, (3) non-staining to painted surfaces, (4) quick action of the leak tracer solution in detecting leaks when exposed to suitable lighting conditions such as white light and/or black light illumination, (5) dual visibility, (6) non-toxicity of the leak tracer solution, which evolves no fumes or odor, and its very high water content makes it dermatologically and environmentally safe, and (7) the remaining entrapped solution following testing can be removed or depuddled. The non-clogging characteristics of the leak tracer solution assures safe and efficient operation of the aircraft following the leak detection procedure. Finally, the leak tracer solution can be readily and efficiently eliminated from the fuel tanks and lines following the testing procedure, particularly by use of a suitable "depuddling" agent, and parasitic growth in the leak tracer solution can be readily controlled by use of anti-parasitic agents.

Although the leak tracer solution of the invention, with its preferred non-staining characteristics with respect to painted surfaces, is usually applied to fuel tanks and lines which have been installed in a painted aircraft, the solution can also be used advantageously for detecting leaks in such systems before they have been installed in a painted aircraft. Either or both the exterior surfaces of the fuel tank and of the adjacent structural components of the aircraft such as the wings can be painted, and the leak tracer solution can come into contact with such painted surfaces by accidental spillage or through leaks, without staining such surfaces.

Since various changes and modifications of the invention will occur to and can be made readily by those skilled in the art without departing from the invention concept, the invention is not to be taken as limited except by the scope of the appended claims.

What is claimed is:

1. A leak tracer solution consisting essentially of a major proportion of water, about 0.1 to about 10% by weight of a nonionic surfactant, and about 0.005 to about 1.0% by weight of a water soluble dye which is essentially non-staining on painted surfaces, and which does not migrate into or penetrate painted surfaces, said painted surfaces containing a polyurethane or epoxy resin base, said nonionic surfactant being of the group consisting of (a) straight chain, primary, aliphatic oxyalkylated alcohol, wherein said alcohols can contain from 8 to 20 carbon atoms and the oxyalkyl groups are ethylene oxide and propylene oxide groups, and (b) ethoxylates of linear secondary aliphatic alcohols, with the hydroxyl groups randomly distributed, the linear aliphatic portion of said alcohols being a mixture of alkyl chains containing in the range from 10 to 17 carbon atoms, and containing an average of from 3 to 12 moles of ethylene oxide.

2. The leak tracer solution as defined in claim 1, said surfactant being present in an amount ranging from about 0.3 to about 2.0% by weight.

3. The leak tracer solution as defined in claim 2, said dye being present in an amount ranging from about 0.01 to about 0.10% by weight.

4. The leak tracer solution as defined in claim 3, wherein said surfactant consists of ethoxylates of a mixture of alcohols having the formula:

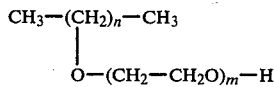

where n is in the range from 9 to 13 and m is an average of 3 to 12.

5. The leak tracer solution as defined in claim 1, said dye being selected from the group consisting of water soluble uranine, rhodamine and eosin dyes.

6. The leak tracer solution as defined in claim 1, wherein said dye is a fluorescent dye.

7. The leak tracer solution as defined in claim 1, wherein said dye is a dual visibility uranine dye.

8. The leak tracer solution as defined in claim 1, wherein said surfactant (a) is a mixture of compounds having the formula:

R—O(A)H wherein R is an essentially linear alkyl group having from 10 to 18 carbon atoms, at least 70 weight percent of said compounds in said mixture having an R of from 12 to 16 carbon atoms, and A is a mixture of oxypropylene and oxyethylene groups, said oxypropylene and oxyethylene groups being from 55 to 80% of the total weight of said compounds, the oxypropylene to oxyethylene ratio of said total weight being from 0.85:1 to 2.75:1, and wherein said surfactant (b) are ethoxylates of a mixture of alcohols having the formula:

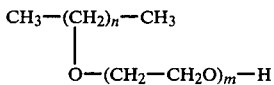

where n is in the range from 9 to 13 and m is an average of 3 to 12.

9. The leak tracer solution as defined in claim 8, wherein R in said surfactant (a) can have from 12 to 18 carbon atoms, and the total number of A groups can range from about 4 to about 14; and wherein in said surfactant (b) the linear alkyl hydrophobic portion of said surfactant is a polyoxyethylene chain randomly attached to the linear alkyl hydrophobic chains through an ether linkage, and wherein said surfactant (b) is selected from the group consisting of said ethoxylates of said mixture of alcohols, wherein n ranges from 9 to 13, and m is an average of 3, 5, 7, 9 or 12.

* * * * *